United States Patent
Rockenfeller et al.

(10) Patent No.: US 9,714,786 B2
(45) Date of Patent: *Jul. 25, 2017

(54) COOLING SYSTEM WITH INCREASED EFFICIENCY

(71) Applicant: Rocky Research, Boulder City, NV (US)

(72) Inventors: Uwe Rockenfeller, Boulder City, NV (US); Kaveh Khalili, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/851,330

(22) Filed: Sep. 11, 2015

(65) Prior Publication Data

US 2016/0003518 A1 Jan. 7, 2016

Related U.S. Application Data

(60) Division of application No. 13/160,208, filed on Jun. 14, 2011, now Pat. No. 9,160,258, which is a
(Continued)

(51) Int. Cl.
*F25D 17/06* (2006.01)
*F25B 49/02* (2006.01)
(Continued)

(52) U.S. Cl.
CPC ............. *F25D 17/06* (2013.01); *F25B 49/02* (2013.01); *F25D 17/065* (2013.01); *H02P 1/30* (2013.01);
(Continued)

(58) Field of Classification Search
CPC .. F25D 17/06; F25B 41/062; F25B 2600/025; F25B 2600/0253; F25B 2600/2513; F25B 2600/2521
(Continued)

(56) References Cited

U.S. PATENT DOCUMENTS 3,424,916 A 1/1969 Fenley
3,798,519 A 3/1974 Habisohn
(Continued)

FOREIGN PATENT DOCUMENTS

EP 0901218 3/1999
EP 1057236 4/2004
(Continued)

OTHER PUBLICATIONS

Buchholz, Energy efficiency improvements in commercial cooling applications, Sanken Technical Report, 2002, vol. 34, Issue 1, pp. 47-50.
(Continued)

*Primary Examiner* — Marc Norman
(74) *Attorney, Agent, or Firm* — Knobbe, Martens, Olson & Bear LLP

(57) ABSTRACT

A cooling system is disclosed. The cooling system may have an evaporator, an evaporator fan, a condenser, and at least one compressor. The compressor may be either a single speed or a variable speed compressor. In addition, the system can use a mechanical or electrical pulsed operation refrigerant flow control valve for controlling refrigerant flow to the evaporator.

16 Claims, 6 Drawing Sheets

Related U.S. Application Data continuation-in-part of application No. 12/510,153, filed on Jul. 27, 2009, now Pat. No. 8,299,653.

(60) Provisional application No. 61/436,565, filed on Jan. 26, 2011.

(51) Int. Cl.
- *H02P 1/30* (2006.01)
- *H02P 1/44* (2006.01)
- *H02P 1/52* (2006.01)
- *H02P 1/56* (2006.01)
- *F25D 19/04* (2006.01)

(52) U.S. Cl.
CPC ............... *H02P 1/44* (2013.01); *H02P 1/52* (2013.01); *H02P 1/56* (2013.01); *F25B 2341/0652* (2013.01); *F25B 2400/06* (2013.01); *F25B 2500/26* (2013.01); *F25B 2600/0253* (2013.01); *F25B 2600/112* (2013.01); *F25B 2600/2513* (2013.01); *F25D 19/04* (2013.01)

(58) Field of Classification Search
USPC .................................................. 62/222, 228.4
See application file for complete search history.

(56) References Cited

U.S. PATENT DOCUMENTS

| | | |
|---|---|---|
| 3,877,243 A | 4/1975 | Kramer |
| 4,006,603 A | 2/1977 | Miles |
| 4,340,823 A | 7/1982 | Miyazawa |
| 4,665,707 A | 5/1987 | Hamilton |
| 4,694,236 A | 9/1987 | Upadhyay et al. |
| 4,893,479 A | 1/1990 | Gillett et al. |
| 5,142,468 A | 8/1992 | Nerem |
| 5,675,982 A | 10/1997 | Kirol et al. |
| 5,712,540 A | 1/1998 | Toda et al. |
| 5,718,125 A | 2/1998 | Pfister et al. |
| 5,874,788 A | 2/1999 | McCartney |
| 5,927,598 A | 7/1999 | Broe |
| 5,929,538 A | 7/1999 | O'Sullivan et al. |
| 5,977,659 A | 11/1999 | Takehara et al. |
| 6,005,362 A | 12/1999 | Enjeti et al. |
| 6,094,034 A | 7/2000 | Matsuura |
| 6,188,591 B1 | 2/2001 | Ruter et al. |
| 6,219,623 B1 | 4/2001 | Wills |
| 6,242,883 B1 | 6/2001 | Strunk |
| 6,257,007 B1 | 7/2001 | Hartman |
| 6,304,006 B1 | 10/2001 | Jungreis |
| 6,316,895 B1 | 11/2001 | Ramarathnam |
| 6,471,013 B2 | 10/2002 | Banno et al. |
| 6,639,373 B2 | 10/2003 | Knight et al. |
| 6,710,573 B2 | 3/2004 | Kadah |
| 6,843,064 B2 | 1/2005 | Khalili et al. |
| 6,847,130 B1 | 1/2005 | Belehradek et al. |
| 7,151,328 B2 | 12/2006 | Bolz et al. |
| 7,332,885 B2 | 2/2008 | Schnetzka et al. |
| 7,495,410 B2 | 2/2009 | Zargari et al. |
| 9,160,258 B2 * | 10/2015 | Rockenfeller ............ H02P 1/30 |
| 2002/0180400 A1 | 12/2002 | George et al. |
| 2003/0048006 A1 | 3/2003 | Shelter, Jr. et al. |
| 2003/0155875 A1 | 8/2003 | Weinmann |
| 2004/0046458 A1 | 3/2004 | MacKay |
| 2004/0095091 A1 | 5/2004 | McNulty et al. |
| 2004/0245949 A1 | 12/2004 | Ueda et al. |
| 2005/0006958 A1 | 1/2005 | Dubovsky |
| 2006/0103342 A1 | 5/2006 | Mechi |
| 2006/0130504 A1 | 6/2006 | Agrawal et al. |
| 2006/0196203 A1 | 9/2006 | Schnetzka et al. |
| 2006/0208687 A1 | 9/2006 | Takeoka et al. |
| 2007/0114962 A1 | 5/2007 | Grbovic |
| 2008/0008604 A1 | 1/2008 | Tolbert |
| 2009/0133419 A1 | 5/2009 | Matsuno et al. |
| 2011/0247350 A1 | 10/2011 | Awwad et al. |

FOREIGN PATENT DOCUMENTS

| | | |
|---|---|---|
| GB | 1287648 | 9/1972 |
| GB | 2354378 | 3/2001 |
| JP | 4-364372 | 12/1992 |
| JP | 5-157330 | 6/1993 |
| JP | 5-276690 | 10/1993 |
| JP | 5-324106 | 12/1993 |
| JP | 7-239672 | 9/1995 |
| JP | 9-168299 | 6/1997 |
| JP | 2005-210869 | 8/2005 |
| JP | 2008-048568 | 2/2008 |
| WO | WO 98/02695 | 1/1998 |
| WO | WO 2005/020407 | 3/2005 |
| WO | WO 2007046330 | 4/2007 |

OTHER PUBLICATIONS

Holtz et al., A high-power multitransistor-inverter uninterruptable power supply system, IEEE Transactions on Power Electronics, Jul. 1988, vol. 3, Issue 3, pp. 278-285.

Mallinson, "Plug and play" single chip controllers for variable speed induction motor drives in white goods and HVAC systems, Thirteenth Annual Applied Power Electronics Conference and Exposition, Feb. 19, 1998, vol. 2, pp. 756-762.

Manz, Applying adjustable speed drives (ASDs) to 3 phase induction NEMA frame motors, Proceedings of 38th Cement Industry Technical Conference, Apr. 14, 1996, pp. 71-78.

Matsui et al., Improvement of transient response of thermal power plant using VVVF inverter, International Conference on Power Electronics and Drive Systems, Nov. 27, 2007, pp. 1209-1214.

Meenakshi et al., Intelligent controller for a stand-alone hybrid generation system, 2006 IEEE Power India Conference, Apr. 10, 2006, pp. 8.

Muntean et al., Variable speed drive structures and benefits in cooling tower fans applications, Dept. of Electr. Eng., Univ. Politehnica of Timisoara, Romania WSEAS Transactions on Systems, Apr. 2007, vol. 6, Issue 4, pp. 766-771.

Nelson et al., Basics and advances in battery systems, IEEE Transactions on Industry Applications, Mar. 1995, vol. 31, Issue 2, pp. 419-428.

Prest et al., Development of a three-phase variable speed drive system for a battery fed underground mining locomotive, Third International Conference on Power Electronics and Variable-Speed Drives, Jul. 13, 1988, pp. 233-236.

Stefanovic, Adjustable speed drives: Applications and R&D needs; Department of Energy, Washington, DC. Report No. ORNL/SUB-80-SN772, Sep. 1995.

Sukumara et al., Fuel cell based uninterrupted power sources, International Conference on Power Electronics and Drive Systems, May 26, 1997, vol. 2, pp. 728-733.

Suryawanshi et al., High power factor operation of a three-phase rectifier for an adjustable-speed drive, IEEE Transactions on Industrial Electronics, Apr. 2008, vol. 55, Issue 4, pp. 1637-1646.

Thoegersen et al., Adjustable Speed Drives in the Next Decade: Future Steps in Industry and Academia, Electric Power Components and Systems, 2004, vol. 32, Issue 1, pp. 13-31.

Tolbert et al., A bi-directional DC-DC converter with minimum energy storage elements, Conference Record of the Industry Applications Conference, 2002., Oct. 13, 2002, vol. 3, pp. 1572-1577.

Tracy et al., Achieving high efficiency in a double conversion transformerless UPS, IECON 2005, Nov. 6, 2005, pp. 4.

Welchko et al., A novel variable frequency three-phase induction motor drive system using only three controlled switches, Thirty-Fifth IAS Annual Meeting and World Conference on Industrial Applications of Electrical Energy, Oct. 8, 2000, vol. 3, pp. 1468-1473.

Yang et al., An improved assessment model of variable frequency-driven direct expansion air-conditioning system in commercial

(56) References Cited

OTHER PUBLICATIONS buildings for Taiwan green building rating system, Taiwan Building and environment, 2007, vol. 42, Issue 10, pp. 3582-3588.

Yuan et al., Integrated uninterruptible DC converter with low input distortion and wide regulation capability, Fifth International Conference on Power Electronics and Variable-Speed Drives, Oct. 26, 1994, pp. 638-644.

Zhan et al., Development of a single-phase high frequency UPS with backup PEM fuel cell and battery, International Conference on Electrical Machines and Systems, Oct. 8, 2007, pp. 1840-1844.

\* cited by examiner

COOLING SYSTEM WITH INCREASED EFFICIENCY

RELATED APPLICATIONS

This application is a divisional of U.S. patent application Ser. No. 13/160,208 filed Jun. 14, 2011, which is a continuation-in-part of U.S. patent application Ser. No. 12/510,153 filed Jul. 27, 2009 and claims the benefit of U.S. Provisional Patent Application Ser. No. 61/436,565 filed Jan. 26, 2011, all of which are hereby incorporated by reference in their entirety.

FIELD OF THE INVENTION

This invention relates to cooling systems and more specifically to refrigeration systems.

BACKGROUND

Existing cooling systems generally have components including a compressor, a condenser, and an evaporator. In most systems, the compressor motor utilizes the majority of the energy as it starts up in order to provide the proper amount of cooling. However, repeatedly starting and running a compressor motor can be inefficient, because the start-up energy requirements of many compressor motors are high in comparison to the energy required to maintain the motor at a desired speed. In addition, the refrigeration system may not function at peak efficiency until the refrigerant pressure in the system increases to a certain target pressure because such systems use capillary tubing or other passive pressure reduction devices to move refrigerant to the evaporator. Because capillary tubing only allows a particular amount of refrigerant through at any given time, in some circumstances, the evaporator may be starved of refrigerant if the capillary piping cannot supply sufficient refrigerant to the evaporator. Conversely, during light loads, the capillary will provide too much refrigerant to the evaporator and may cause it to be flooded with refrigerant. Both evaporator starving and flooding reduce efficiency of the refrigeration system. Conventional modulating expansion valves are not employed as their poor response time and inaccurate superheat control only offers little advantage over the passive expansion devices, such as capillaries, orifice packs or porous plugs. In addition to the above energy efficiency and capacity deficiencies, flooding can result in liquid refrigerant entering the compressor, which can harm the compressor and reduce its life expectancy.

SUMMARY OF THE INVENTION

Described herein is a cooling system. In some embodiments, the cooling system comprises at least one evaporator, at least one evaporator fan, and at least one constant speed compressor. In an embodiment, the system further comprises a refrigerant loop including piping for directing refrigerant from the at least one compressor to at least one condenser and from the at least one condenser to the at least one evaporator. In an embodiment, the system further comprises a pulsed operation refrigerant flow control valve for controlling refrigerant flow to the at least one evaporator and a control system connected to the at least one compressor and configured to manage start up and pull-down efficiency of the refrigerator.

Also disclosed herein is a cooling system. In some embodiments, the cooling system comprises at least one evaporator; at least one evaporator fan, and at least one variable speed compressor motor. In an embodiment, the system further comprises a refrigerant loop including piping for directing refrigerant from at least one compressor to at least one condenser and from the at least one condenser to the at least one evaporator. In an embodiment, the system further comprises a pulsed operation refrigerant flow control valve for controlling refrigerant flow to the at least one evaporator and a control system configured to vary the speed of the at least one compressor motor to increase efficiency of the cooling system.

Also disclosed herein is a method of controlling a cooling system. In an embodiment, the method comprises providing at least one evaporator fan, providing at least one single speed compressor motor, maintaining refrigerant fluid pressure within an evaporator using a pulsed operation refrigerant flow control valve, and controlling the on and off characteristics of the compressor motor to increase efficiency of the cooling system.

Also disclosed herein is a method of controlling a cooling system. In an embodiment, the method comprises providing at least one evaporator fan, providing at least one variable speed compressor motor, maintaining refrigerant fluid pressure within an evaporator using a pulsed operation refrigerant flow control valve, and controlling the speed of the compressor motor to increase efficiency of the cooling system.

DETAILED DESCRIPTION

Embodiments of the invention relate to cooling systems, such as conventional refrigerators and freezers having increased thermal efficiency. In one embodiment, the cooling system utilizes a thermostatic expansion valve (TXV) in a cooling system with a constant speed compressor to increase energy efficiency and/or pull-down capacity. By using this combination of a constant speed compressor and TXV during the cooling systems' start-up, shut down and other varying conditions, cooling systems were found to exhibit increased efficiency in comparison to systems that do not employ the TXV as described below. In one embodiment, the TXV is a pulsing TXV wherein the valve controls refrigerant flow by pulsing the refrigerant through the cooling system piping.

Another embodiment is a cooling system that has a variable speed compressor and utilizes a TXV to increase operational efficiency of the system. In this embodiment, the speed of the variable speed compressor can be controlled in order to adapt the refrigeration capacity to the load and provide increased efficiency in the cooling system. As the system monitors and controls the speed of the compressor, the TXV, or pulsing TXV, maintains proper pressure within the cooling system so that the system runs efficiently in comparison to systems that do not have these elements. The pulsing TXV maintains constant superheat during all conditions including the transient conditions and maintains full use of the evaporator surfaces. For example, during start up, the system may run the compressor at a predetermined slower speed prior to ramping up the compressor speed up in order to save energy on start-up. In some cases, starting the compressor at full speed may require a very large initial current load in comparison to starting the compressor at an initial lower speed. Because the TXV allows the system to maintain sufficient pressure within the cooling system, even at lower compressor speeds, the system can start up and run very efficiently.

Figure 1A:
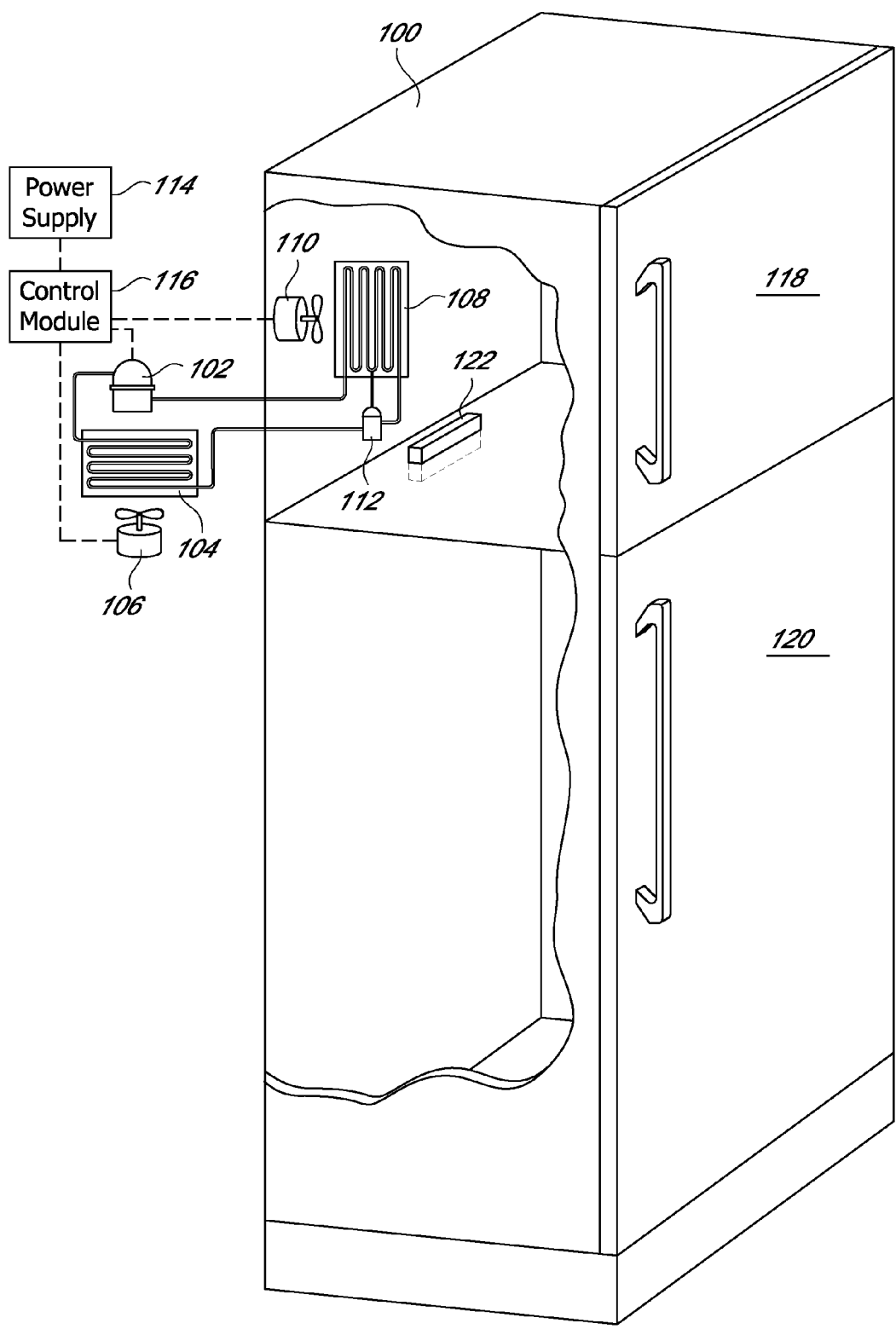
FIG. 1A is a perspective view of a cooling system according to one embodiment.

FIG. 1A is a perspective view of a cooling system 100 according to one embodiment. The cooling system may be a refrigerator, as illustrated in FIG. 1A, or any other system in which it is desirable to maintain a cool or cold temperature. In some embodiments, the cooling system 100 has components which include a compressor 102, a condenser 104, a condenser fan 106, an evaporator 108, and an evaporator fan 110. In some embodiments, the components are connected by a refrigerant loop. The refrigerant loop may be made of metal or plastic piping, or any material that allows refrigerant to flow between components. In an embodiment, the refrigerant loop connects the compressor 102 to the condenser 104, the condenser 104 to the evaporator 108, and the evaporator 108 to the compressor 102.

In an embodiment, a thermostatic expansion valve (TXV) 112 is positioned in the refrigerant loop between the condenser 104 and the evaporator 108 to maintain constant refrigerant pressure in the evaporator 108 despite changing refrigerant flow rates.

In an embodiment, the TXV 112 is a pulsed operation refrigerant control valve (pulsed TXV). The pulsed TXV may be a mechanical valve such as the type described in U.S. Pat. Nos. 5,675,982 and 6,843,064, or an electrically operated valve of the type described in U.S. Pat. No. 5,718,125, the descriptions of which are incorporated herein by reference in their entireties. By actively controlling refrigerant flow to the evaporator, efficiency is increased during a variety of cooling conditions and pull-down time may be reduced. Pull-down time is defined as the time required to bring the internal temperature of the cooling system down to a safe set point. Faster "pull-down" means less time to reach the safe set point temperature. The pull-down is directly related to the refrigerator's ability to maintain temperature within safe limits. Pull-down is also directly related to energy consumption because a fast pull-down results in a shorter period of time that the compressor is running.

In one embodiment, a mechanical pulsed TXV is used. A mechanical pulsed TXV is similar to that of conventional mechanical TXVs, except the valve pulses to control flow, rather than modulating the degree of plug opening. The valve may comprise a bulb that can be placed in the evaporator. When the bulb pressure reaches a set threshold, the diaphragm opens the inlet port and the valve cavity is pressurized. An outlet restriction may cause cavity pressure to rise above evaporator pressure, and the valve re-closes. The valve pulses in this manner until the evaporator cools and the bulb pressure decreases to the point where the diaphragm no longer opens the valve. Superheat can be adjusted by changing spring pressure and/or bulb charge. The outlet restriction may be several times the diameter of a capillary or orifice sized for the same application, and is large enough to be immune from plugging. The pulsing mechanism allows for precise refrigerant flow control and faster pull-down by maintaining an adequate amount of liquid refrigerant in the evaporator at all times, to prevent "starving" the evaporator. Traditional capillary or orifice devices are considerably less efficient because they are designed for a constant refrigerant flow during altering conditions and not designed for variable flow. Thus, traditional capillary or orifice devices usually do not allow enough liquid refrigerant to enter the evaporator, which "starves" the evaporator and increases pull-down time.

Figure 4:
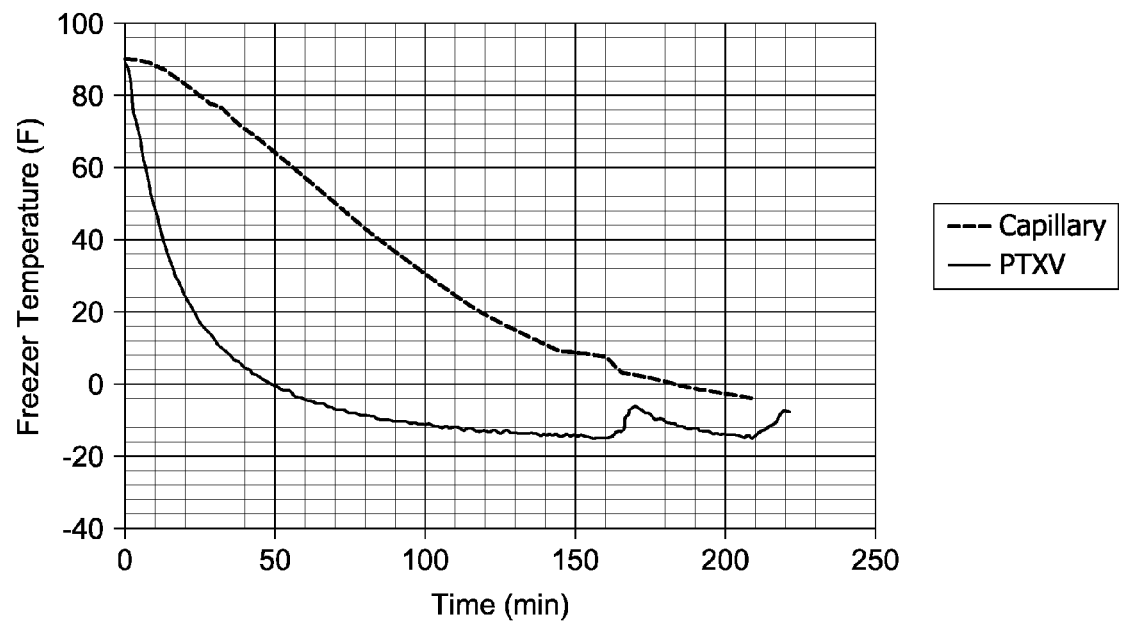
FIG. 4 illustrates the advantages of using a pulsing TXV over a traditional capillary device.

In one of embodiment of the invention, the compressor 102 comprises a single speed compressor motor. When a single speed compressor motor is used, the pulsed TXV increases energy efficiency and pull-down capacity during start-up and varying conditions including evaporator temperature and condenser temperature. In this embodiment, the pull-down time may be improved by up to 300%. In some embodiments, the pulsed TXV settings can be adjusted to either maximize pull-down improvement or energy efficiency. For example, the valve may be adjusted to yield a pull-down improvement of up to 50% and an energy efficiency improvement of 10 to 15% or a pull-down improvement of 25% and an energy efficiency improvement of 20%. FIG. 4 illustrates the advantages of using a pulsing TXV over a traditional capillary device.

In another embodiment, the compressor 102 comprises a variable speed compressor motor. The variable speed compressor motor can be any type of variable speed motor including three phase motors and single phase motors. When a three phase motor is used, a variable frequency drive (VFD) may be used to power the motor. Single phase and DC powered motors do not require a VFD and can be, for example, an electronically commutated motor (ECM). When a variable speed compressor motor is used, the pulsed TXV increases energy efficiency and pull-down capacity during start-up, shut down, varying conditions including evaporator temperature and condenser temperature, and during operation at different compressor speeds. Thus, the pulsed TXV facilitates the benefits of variable speed operation.

In some embodiments, the cooling system 100 has a power supply 114, and a control module 116. In an embodiment, the power supply 114 is a standard alternating current (AC) power supply with a direct current (DC) power converter, or a DC power supply. In an embodiment, the power supply 114 does not incorporate a variable frequency drive inverter (VFD).

In some embodiments, the cooling system 100 comprises two separate cooling chambers: a first cooling chamber 118 and a second cooling chamber 120. This is seen most readily in conventional refrigerator/freezer combination units, where a freezer unit is on top and a refrigerator is below. In this embodiment, the evaporator 108 is positioned in the first cooling chamber. The first cooling chamber 118 is connected to the second cooling chamber 120 through vents or a connecting port or tube 122 so that cool air flows from the evaporator, to the first cooling chamber, and from the first cooling chamber to the second cooling chamber. Refrigerator/freezer combinations may be configured as top mount freezers, bottom mount freezers, side-by-side configurations and other configurations known to those skilled in the art.

Figure 1B:
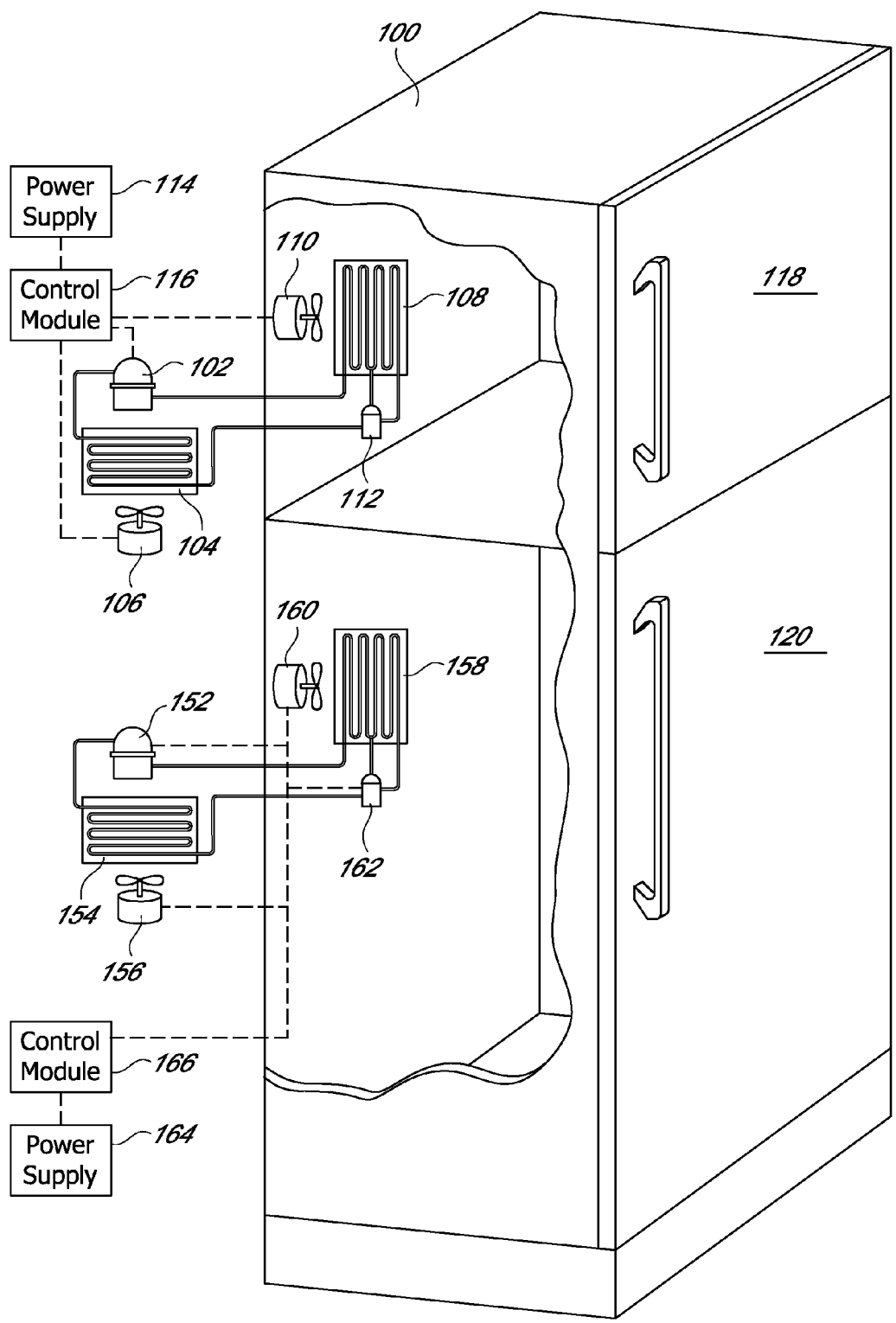
FIG. 1B is a perspective view of a cooling system according to another embodiment.

FIG. 1B illustrates a perspective view of another embodiment of a cooling unit that uses two separate cooling devices. In this embodiment, the cooling system 100 additionally comprises a second compressor 152, a second condenser 154, a second condenser fan 156, a second evaporator 158, a second evaporator fan 160, a second TXV 162. In some embodiments, the cooling system also comprises a second power supply 164 and a second control module 166. In an embodiment, the first evaporator 108 is located in the first cooling chamber 118, while the second evaporator 158 is located in the second cooling chamber 120. Thus, in this embodiment there is no need for connecting vents or ports, as each chamber has a separate cooling system.

Figure 2A:
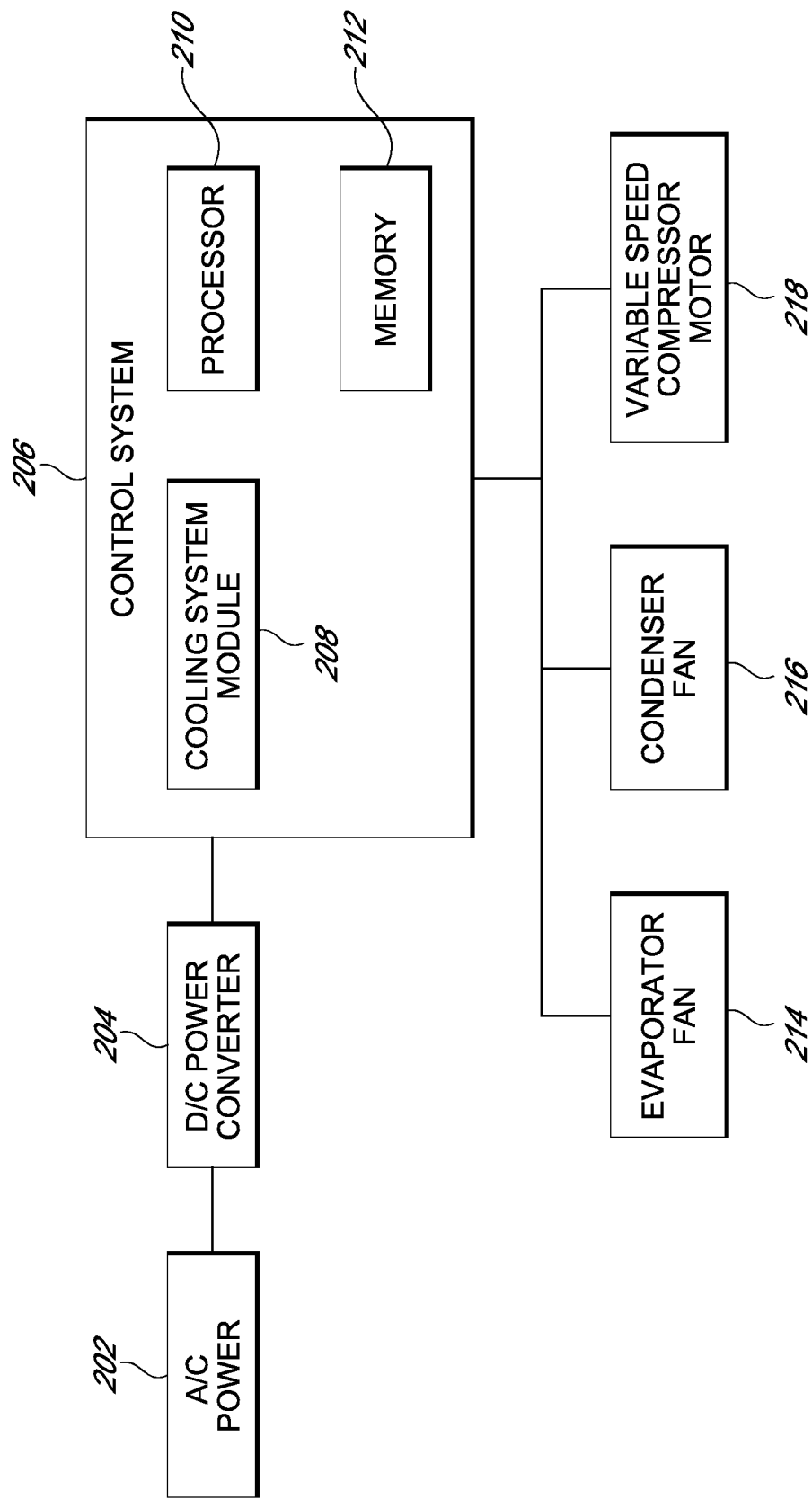
FIG. 2A is a block diagram illustrating a cooling system according to one embodiment

FIG. 2A is a block diagram illustrating a cooling system 100 according to one embodiment. The cooling system 100 comprises an AC power supply 202 and a DC power converter 204 connected to a control system 206. In an embodiment, the control system 206 comprises a cooling system module 208, a processor 210, and memory 212. Many types of processors and memory are well known in the art and may be readily selected by one of skill in the art. In one embodiment, the control system 206 provides control settings for the components of the cooling system 100, including, for example, the evaporator fan 214, condenser fan 216, and/or the compressor motor 218. In one embodiment, the control system 206 also provides power to the components of the cooling system 100. In another embodiment, the components may be powered by one or more separate power supplies.

Figure 2B:
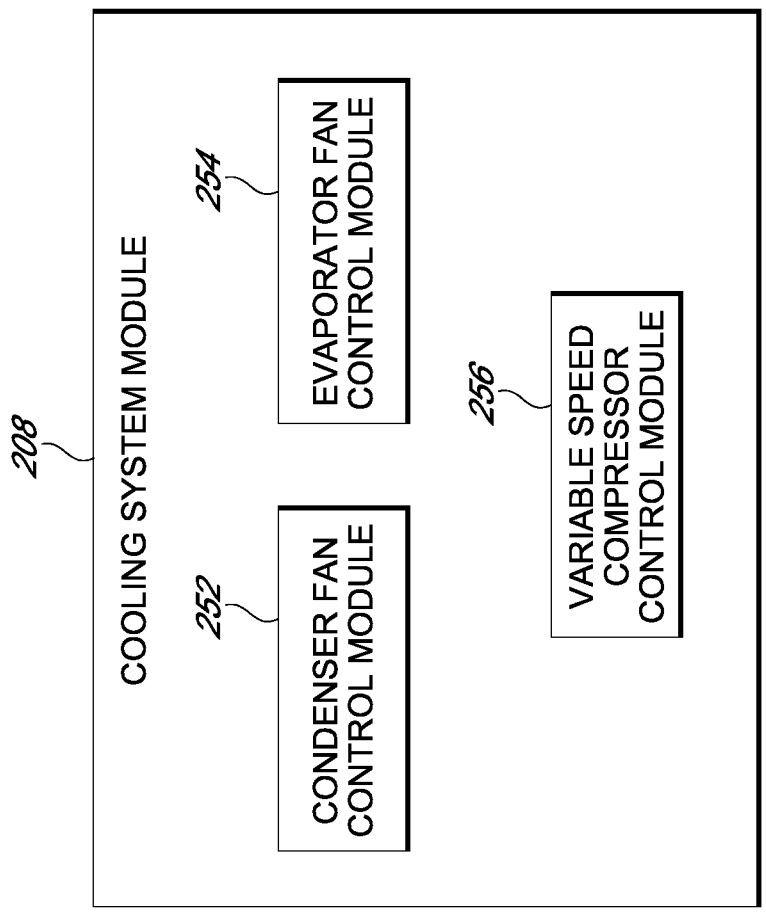
FIG. 2B is a block diagram illustrating the cooling system module according to an embodiment.

FIG. 2B is a block diagram illustrating the components of the cooling system module 208. In the illustrated embodiment, cooling system module 208 has a condenser fan control module 252, an evaporator fan control module 254, and a compressor motor control module 256.

Figure 3:
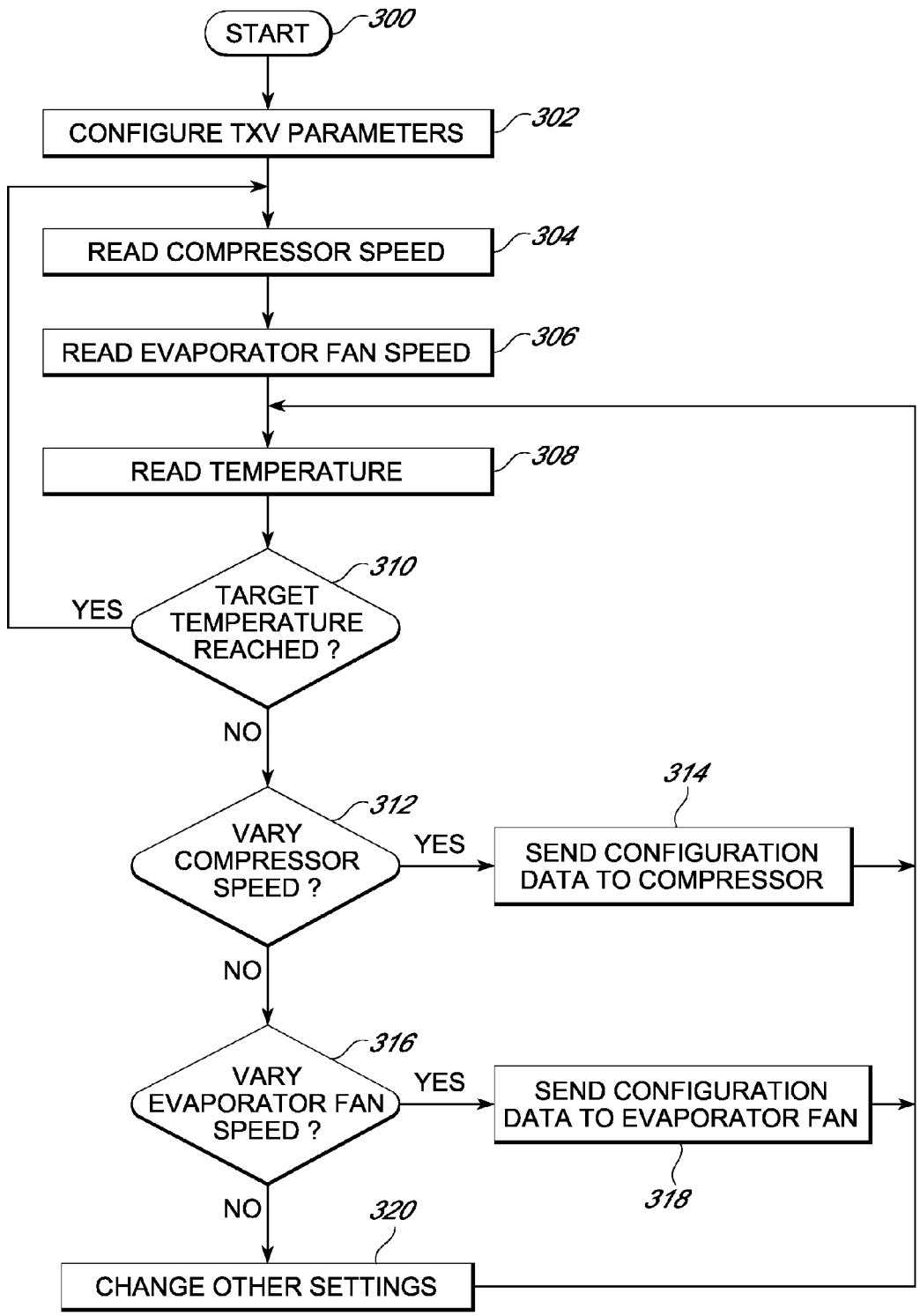
FIG. 3 is a flow diagram illustrating an overview of the control module.

FIG. 3 is a flow diagram illustrating an overview of the operation of the control system module 208. In step 300, the control system module is started. The process then moves to configure the TXV parameters at step 302. The TXV parameters may be configured, for example, at the factory that builds the system or on site where the system is installed. The process then moves to read the compressor speed at step 304. The system may use the compressor motor control module 256 as part of this step. The process then reads the evaporator fan speed at step 306 using the evaporator fan control module 254 and then moves to read the temperature at step 308.

The process then moves to a decision step 310, wherein instructions in the control system module determine whether the target temperature has been reached. If the target temperature is reached, the process returns to step 304. If the target temperature has not been reached, the control module proceeds to decision step 312, where the control module determines whether to vary the compressor speed. If the control module determines that the compressor speed should be varied, the control module will send configuration data to the compressor at step 314, and then returns to step 308 to read the temperature again. If the control module determines that the compressor speed should not be varied, or in situations where a single speed compressor is used, the process moves to step 316, wherein instructions in the control module determine whether to vary the evaporator fan speed. If the control module determines that the evaporator fan speed should be varied, the control module proceeds to step 318, wherein either configuration data, or altered power settings are sent to the evaporator fan in order to control the evaporator fan speed. The process then returns to step 308, where the temperature is read again. If the control module determines that the evaporator fan speed should not be varied, the process proceeds to step 320, wherein instructions in the control module vary any other required system settings. The process then returns to step 308 to read the temperature again. The other settings may include any other settings such as condenser fan speed, or any other setting for any component that could be used to alter the temperature.

Also disclosed herein, is a method of configuring a cooling system. In some embodiments, the method comprises providing at least one evaporator fan, providing at least one single speed compressor motor, maintaining refrigerant fluid pressure within an evaporator using a pulsed operation refrigerant flow control valve, and controlling the on and off characteristics of the compressor motor to increase efficiency of the cooling system. In one embodiment, controlling the on and off characteristics comprises controlling the compressor motor to increase the pull-down rate of the cooling system. In one embodiment, the method relates to connecting the at least one evaporator to a first cooling chamber and connecting the first cooling chamber to a second cooling chamber. In another embodiment, the method relates to connecting a first evaporator to a first cooling chamber and connecting a second evaporator to a second cooling chamber.

Also disclosed herein, is a method of configuring a cooling system. In some embodiments, the method includes providing at least one evaporator fan, providing at least one variable speed compressor motor, maintaining refrigerant fluid pressure within an evaporator using a pulsed operation refrigerant flow control valve, and controlling the speed of the compressor motor to increase efficiency of the cooling system. In one embodiment, the variable speed compressor may be a single phase compressor. Single phase compressors may include, for example, electronically commutated (ECM) motors. In some embodiments, the method further comprises connecting the at least one evaporator to a first cooling chamber and connecting the first cooling chamber to a second cooling chamber. In an embodiment, the method further comprises connecting a first evaporator to a first cooling chamber and connecting a second evaporator to a second cooling chamber.

EXAMPLE 1

Pull-Down Tests with Household Refrigerators

A refrigerator is an insulated cabinet with an electric compressor which cycles a refrigerant fluid, where by evaporation of refrigerant liquid in the evaporator the refrigerator cools down. When the door is opened, the cold air falls out to be replaced by warm air in the room, which triggers the compressor to start and to circulate the refrigerant liquid and cool down the internal temperature and keep the food safe. The time required to bring the refrigerator internal temperature down to a safe set point is defined as "pull-down", so faster "pull-down" means shorter period to reach the safe set point temperature. The pull-down is directly related to the refrigerator's ability to cope with the heat loss without food safety risks. It is also directly related to the energy consumption and energy rating of the refrigerator, as fast pull-down results in shorter period the compressor is on and consumes electricity.

In this example, a Pulsing Thermal Expansion Valve was used, wherein the valve pulses to control flow, rather than modulating the degree of plug opening. When the bulb pressure calls for refrigerant flow, the diaphragm opens the inlet port and the valve cavity is pressurized. An outlet restriction causes cavity pressure to rise above evaporator pressure, and the valve immediately re-closes. The valve continuously pulses in this manner until the evaporator cools and the bulb pressure decreases to the point where the diaphragm no longer opens the valve. Like any thermal expansion valve, superheat is adjustable by changing spring pressure and/or bulb charge. The outlet restriction is several times the diameter of a capillary or orifice sized for the same application, and is large enough to be immune from plugging. The pulsing mechanism allows for precise refrigerant flow control and faster pull down is possible as the evaporator is kept full of liquid refrigerant during the period of pull-down.

In this example, a 30 cubic foot side-by-side refrigerator/freezer combination was tested using standard capillary piping or piping with a pulsing thermal expansion valve. The pull-down was improved by more than 300% when using a pulsing TXV in the system as shown in the FIG. 4. The freezer compartment reached the 0° F. target in 180 minutes in the absence of a thermal expansion valves. In contrast, in systems with the pulsing TXV the freezer compartment temperature reached the 0° F. target temperature in less than 60 minutes.

Depending on the size and type of the refrigerator the improvement in pull-down can be from 25% to more than 300%.

While the above detailed description has shown, described, and pointed out novel features as applied to various embodiments, it will be understood that various omissions, substitutions, and changes in the form and details of the devices and processes illustrated may be made by those skilled in the art without departing from the spirit of the invention. As will be recognized, the present invention may be embodied within a form that does not provide all of the features and benefits set forth herein, as some features may be used or practiced separately from others. Moreover, it is to be understood that the power supply system described above for use in an HVAC/R system may be configured as an air conditioner, chiller, heat pump or refrigeration system, but is not limited thereto.

What is claimed is:

1. A cooling system having at least one cooling chamber, comprising:
    at least one evaporator;
    at least one evaporator fan;
    at least one variable speed compressor;
    a refrigerant loop including piping for directing refrigerant from at least one compressor to at least one condenser and from the at least one condenser to the at least one evaporator;
    a mechanical pulsed operation refrigerant flow control valve configured to control the pressure of refrigerant flow to the at least one evaporator so that the pressure in the at least one evaporator remains relatively constant and to reduce pull-down time of the at least one cooling chamber to a target temperature, wherein settings of the mechanical pulsed operation refrigerant flow control valve are adjusted to maximize improvement of the pull-down time; and
    a control system connected to the at least one compressor and configured to reduce the pull-down time of the at least one cooling chamber by controlling the variable speed of the compressor motor.

2. The cooling system of claim 1, wherein the control system is configured to control the speed of the evaporator fan.

3. The cooling system of claim 1, wherein the system comprises a freezer section.

4. The cooling system of claim 3, wherein the cooling system has one compressor for a refrigerator section and one compressor for the freezer section.

5. The cooling system of claim 1, wherein the at least one variable speed compressor is a single phase variable speed compressor.

6. The cooling system of claim 5, wherein the single phase variable speed compressor comprises an electronically commutated motor.

7. The cooling system of claim 1, wherein the at least one variable speed compressor is a three phase variable speed compressor.

8. The cooling system of claim 1, wherein the at least one variable speed compressor is powered by a variable frequency drive.

9. A method of controlling a cooling system, comprising:
    providing at least one evaporator fan;
    providing at least one variable speed compressor;
    maintaining refrigerant fluid pressure within an evaporator using a mechanical pulsed operation refrigerant flow control valve so that the pressure in evaporator remains relatively constant to reduce pull-down time to a target temperature of the cooling system, wherein settings of the mechanical pulsed operation refrigerant flow control valve are adjusted to maximize improvement of the pull-down time; and
    controlling the variable speed characteristics of the compressor to reduce the pull-down time of the cooling system.

10. The method of claim 9, further comprising connecting the at least one evaporator to a first cooling chamber and connecting the first cooling chamber to a second cooling chamber.

11. The method of claim 9, further comprising connecting a first evaporator to a first cooling chamber and connecting a second evaporator to a second cooling chamber.

12. The method of claim 9, further comprising controlling the speed of the evaporator fan.

13. The method of claim 9, wherein the method of controlling the cooling system comprises a method of controlling a freezer section.

14. The method of claim 9, wherein controlling the variable speed characteristics of the compressor comprises controlling the variable speed characteristics of a single phase variable speed compressor.

15. The method of claim 14, wherein controlling the variable speed characteristics of the compressor comprises controlling the variable speed characteristics of an electronically commutated motor.

16. The method of claim 9, wherein controlling the variable speed characteristics of the compressor comprises controlling the variable speed characteristics of a three phase variable speed compressor.

* * * * *